(12) United States Patent
Eie et al.

(10) Patent No.: US 10,322,460 B2
(45) Date of Patent: Jun. 18, 2019

(54) CHAIN DRIVEN DIAMOND WIRE CUTTER

(71) Applicant: Oceaneering International, Inc., Houston, TX (US)

(72) Inventors: Bjørn Larsen Eie, Sandnes (NO); Michal Larsen Beranek, Sandnes (NO); Steffan Kruse Lindsø, Hafrsfjord (NO)

(73) Assignee: Oceaneering International, Inc., Houston, TX (US)

( * ) Notice: Subject to any disclaimer, the term of this patent is extended or adjusted under 35 U.S.C. 154(b) by 32 days.

(21) Appl. No.: 15/705,760

(22) Filed: Sep. 15, 2017

(65) Prior Publication Data

US 2018/0071844 A1      Mar. 15, 2018

Related U.S. Application Data

(60) Provisional application No. 62/395,268, filed on Sep. 15, 2016.

(51) Int. Cl.
| | |
|---|---|
| *B26D 1/547* | (2006.01) |
| *B23D 57/00* | (2006.01) |
| *B28D 5/04* | (2006.01) |
| *B23D 61/18* | (2006.01) |

(52) U.S. Cl.
CPC ..... *B23D 57/0061* (2013.01); *B23D 57/0053* (2013.01); *B23D 57/0069* (2013.01); *B23D 61/185* (2013.01); *B28D 5/045* (2013.01); *B23D 57/0084* (2013.01)

(58) Field of Classification Search
CPC ............ B23D 57/0053; B23D 57/0061; B23D 57/0069; B23D 57/0084; B23D 61/185; B28D 5/045
See application file for complete search history.

(56) References Cited

U.S. PATENT DOCUMENTS

| | | | | |
|---|---|---|---|---|
| 2008/0022830 A1* | 1/2008 | Lawler | ............... | B23D 57/0061 83/651.1 |
| 2009/0314149 A1* | 12/2009 | Clark, II | ............ | B23D 57/0007 83/651.1 |
| 2014/0157964 A1* | 6/2014 | Davis | ................. | B23D 57/0007 83/56 |

\* cited by examiner

*Primary Examiner* — Stephen Choi
(74) *Attorney, Agent, or Firm* — Maze IP Law, P.C.

(57) ABSTRACT

A diamond wire cutter, using an adjustable length pulley system, a diamond wire saw, and a movable pulley cart, can perform a through-cut of complete sections of a structure such as a tubular subsea by fitting a chain about an outer surface of the structure, securing the chain to the movable pulley cart and using the chain to move or otherwise guide the movable pulley cart about the outer circumference of the structure to cut while using a diamond wire to effect a cut between the movable pulley cart and the diamond wire saw.

9 Claims, 4 Drawing Sheets

CHAIN DRIVEN DIAMOND WIRE CUTTER

RELATION TO PRIOR APPLICATIONS

This application claims priority from and through U.S. Application 62/395,268 titled "Chain Driven Diamond Wire Cutter" and filed on Sep. 15, 2016.

BACKGROUND OF THE INVENTION

Current technology available for cutting, using diamond wire can be categorized into three categories.

In a first category, cutting is accomplished using a pulley system and guide wheels. This technology is mainly used on shore and has the disadvantage that for large sections, the guide wheels will need to be re-positioned and the wire will have to be shortened at regular intervals through the cutting operation.

In a second category, cutting is accomplished using diamond wire saws with clamp. These clamp saws are efficient, but has the main disadvantage that they only fit a small range of diameters and that the tool has to be bigger than the diameter you cut, due to the need for clamp.

In a third category, cutting is accomplished using a cart with diamond wire mounted on the cart. By only mounting the diamond wire on the cart itself, only the circumference can be cut, not the through section. Further this technology will not allow for cuts on a straight or inverse curvature surface. Further it requires a track, custom built to the diameter of the section to be cut.

One issue that arises with these systems is that they are not easily useful when cutting large size structures (>4 m outer diameter) subsea.

FIGURES

The figures supplied herein illustrate various embodiments of the invention.

Figure 5:
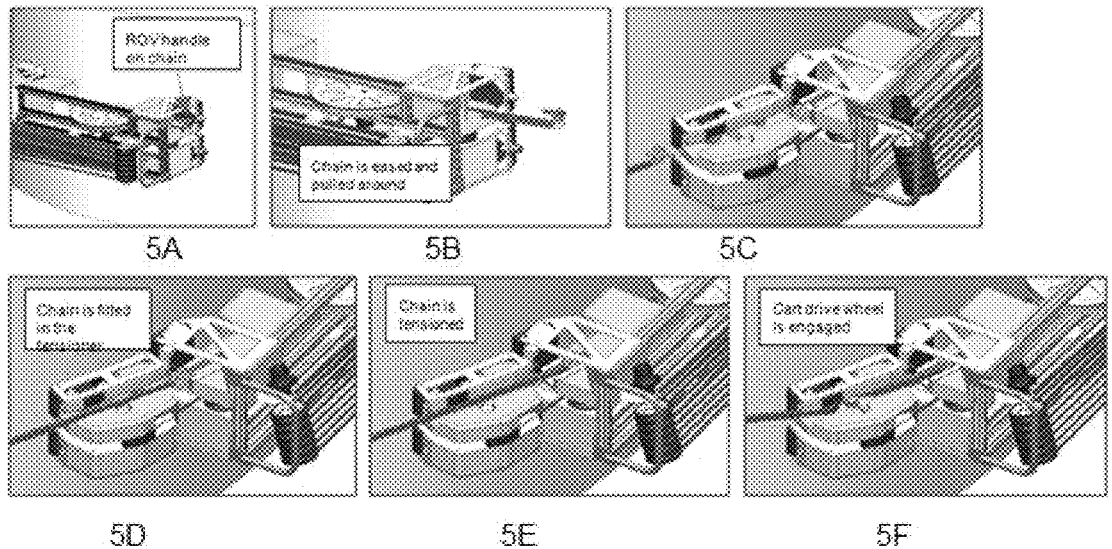
Figure 6:
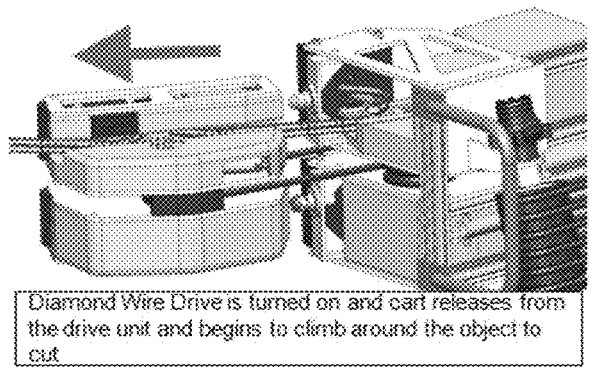
Figure 7:
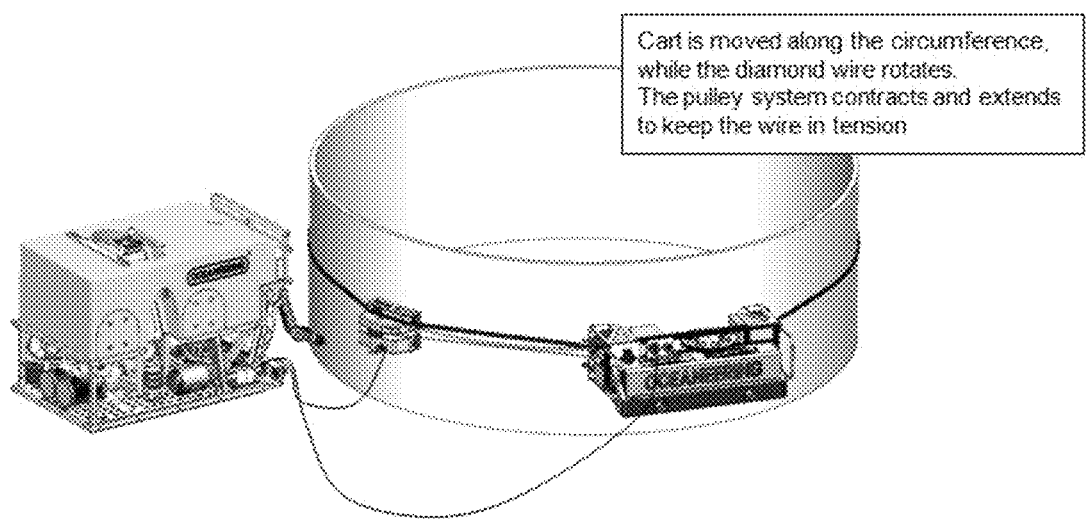
Figure 8:
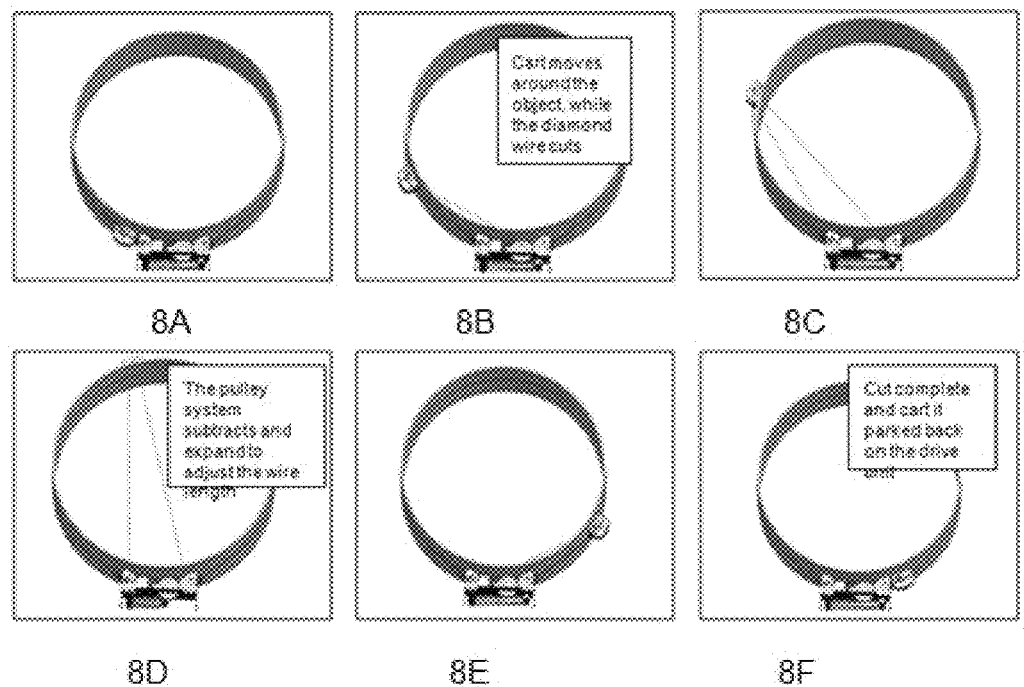

FIG. 5, which includes FIGS. 5A-5F, are views in partial perspective of the exemplary embodiment of the diamond wire cutter being initiated;

FIG. 6 is a view of partial perspective of the exemplary embodiment of the diamond wire cutter about to be engaged;

FIG. 7 is a view of partial perspective of the exemplary embodiment of the diamond wire cutter beginning to travel about an outer circumference of the tubular to be cut; and FIG. 8 is a view of partial perspective of the exemplary embodiment of the diamond wire cutter as it travels about an outer circumference of the tubular to be cut.

DESCRIPTION OF EXEMPLARY EMBODIMENTS

Figure 1:
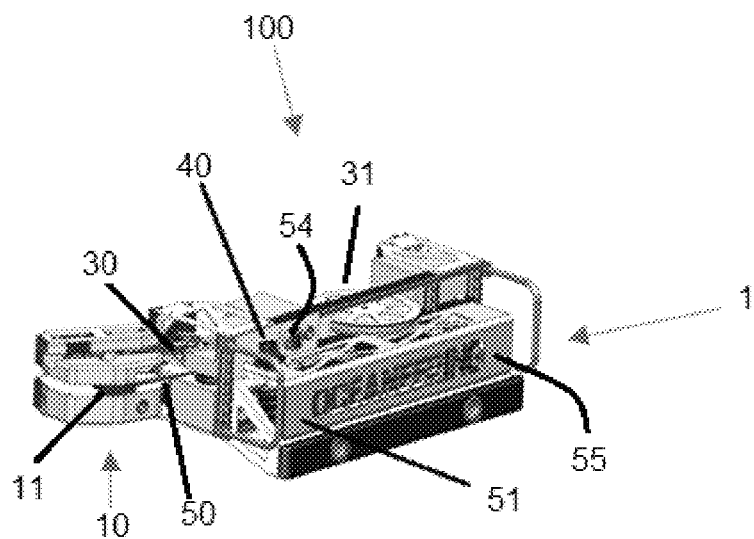
FIG. 1 is a view in partial perspective of an exemplary embodiment of a diamond wire cutter.

Referring now to FIG. 1, in an embodiment diamond wire cutter 100 comprises diamond wire saw 1, movable pulley cart 10 disposed proximate, or otherwise coupled or docked, to diamond wire saw 1, and chain tensioner 32 (FIG. 2) adapted to receive a predetermined portion of chain 30 and maintain tension on chain 30. By way of example and not limitation, diamond wire saw 1 may comprise docking lugs 56 (FIG. 3) and movable pulley cart 10 comprise a complimentary set of lug receivers 16 (FIG. 3). Although not specifically illustrated, diamond wire saw 1 may comprise a set of docking lugs 56 on each of two opposing sides and movable pulley cart 10 comprise a complimentary set of lug receivers 16 on each of its two opposing sides to allowing docking of movable pulley cart 10 at either end of diamond wire saw 1.

In an embodiment, diamond wire saw 1 comprises diamond wire rotator 40; diamond wire 50, comprising a fixed total length and a variable exposed length and operatively in communication with diamond wire rotator 40; chain 30, comprising first chain end 30a (FIG. 3) and second chain end 30b (FIG. 3); and chain driver 31 operatively connected to chain 30.

In embodiments, diamond wire cutter 100 comprises housing 55 in which at least some components of diamond wire saw 1 are at least partially housed.

Chain driver 31 typically comprises a motor and a drive wheel operatively connected to the motor.

Chain tensioner 32 is typically present as well and may be disposed at least partially within diamond wire saw 1.

Figure 2:
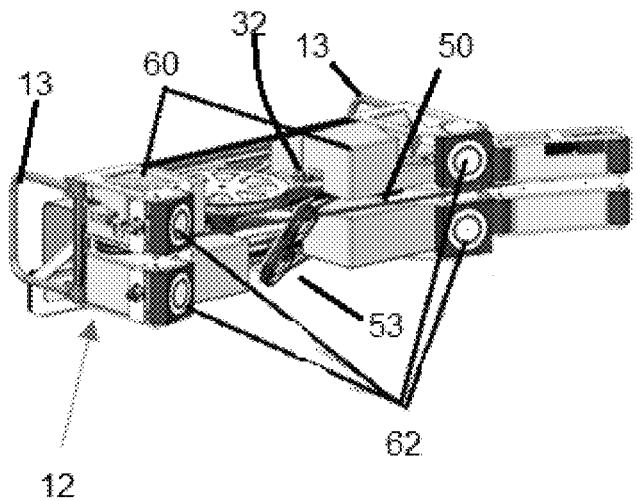
FIG. 2 is a view in partial perspective of the exemplary embodiment of the diamond wire cutter from its opposite side.
Figure 3:
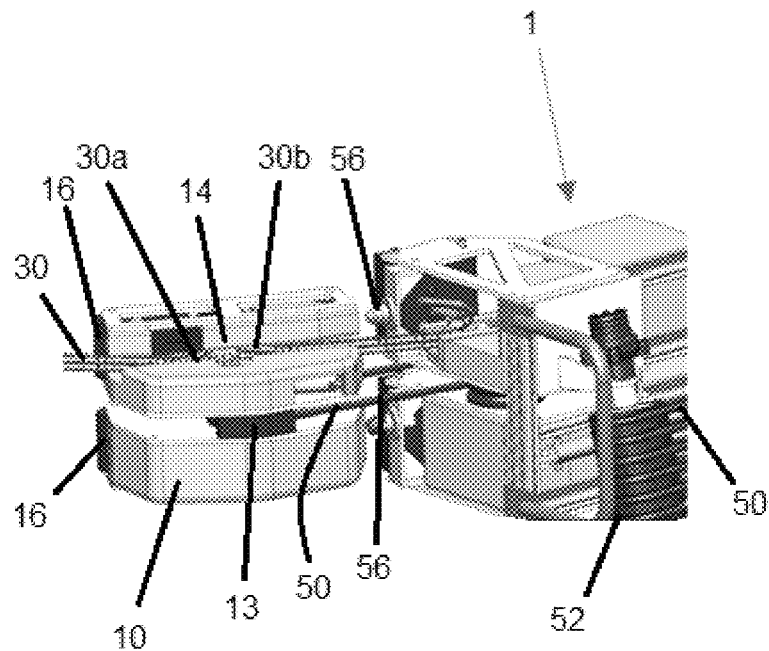
FIG. 3 is a view in partial perspective of a close-up of an end of the exemplary embodiment of the diamond wire cutter.
Figure 4:
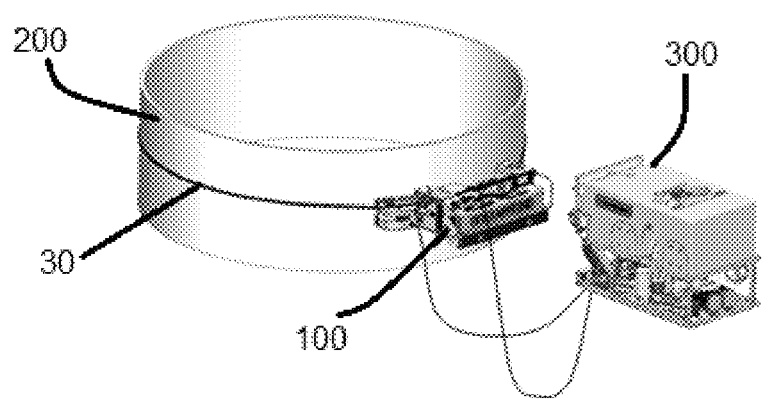
FIG. 4 is a view in partial perspective of the exemplary embodiment of the diamond wire cutter deployed about a tubular to be cut.

Referring additionally to FIG. 2, in embodiments diamond wire saw 1 further comprises one or more expandable pulleys 53 adapted to accept diamond wire 50. In addition, in certain embodiments, diamond wire saw 1 further comprises one or more buoyancy floats 60 and/or one or more magnets 62 where magnets 62 are adapted to aid in adhering diamond wire saw 1 to a structure to be cut such as pipe 200 (FIG. 4).

Where it is compatible with a remotely operated vehicle (ROV), diamond wire cutter 100 typically comprises one or more, usually two, remotely operated vehicle compatible handles 13 disposed about a predetermined portion of 1 diamond wire saw 1, e.g. on opposing sides of housing 55, as well as remotely operated vehicle power interface 54 which is operatively in communication with diamond wire rotator 40 and/or chain driver 31. Because various components of diamond wire cutter 100 can be hydraulically and/or electrically operated, remotely operated vehicle power interface 54 can be a hydraulic power interface, an electrical power interface, or the like, or a combination thereof.

Referring additionally to FIG. 3, movable pulley cart 10 is typically operatively connected to chain 30 such as at chain receiver 14 which adapted to receive first chain end 30a and/or second chain end 30b. As one of ordinary skill in these arts will appreciate, chain receiver 14 may be a single connection point, as illustrated in FIG. 3, or two separate chain receivers, first chain receiver 14a and second chain receiver 14b (neither shown in the illustrations) which can be located at two separate places of movable pulley cart 10. In most embodiments, movable pulley cart 10 is releasably connected to diamond wire saw 1, by way of example and not limitation such as being selectively dockable to diamond wire saw 1. Movable pulley cart 10 typically comprises one or more diamond wire pulleys 13 adapted to receive a portion of diamond wire 50.

In an embodiment, diamond wire saw 1 is a wire carrier which comprises a wire carrier housing similar to housing 55, a wire carrier chain similar to chain 30, and a diamond wire similar to diamond wire 50. In these embodiments, movable pulley cart 10 is releasably connected to the wire carrier housing such as by being selectively dockable to the wire carrier housing, operatively connected to the wire carrier chain, and adapted to receive a portion of the diamond wire.

In the operation of an exemplary embodiment, referring generally to FIGS. 4-8, through-cutting of a tubular, e.g. pipe 200 (FIG. 4), may be accomplished using diamond wire cutter 100 (FIG. 4), which is as described above. Typically, remotely operated vehicle (ROV) 300 (FIG. 4) is used to maneuver diamond wire cutter 100 to a location proximate tubular 200 to be cut. Use of diamond wire cutter 100 typically also only requires one ROV 300 to install and operate, e.g. there are no cranes required.

Chain 30 is then disposed about a predetermined portion of an outer surface of tubular 200, e.g. about an entire circumference of tubular 200, such as by using ROV 300 and first chain end 30a (FIG. 3) and second chain end 30b (FIG. 3) secured or otherwise attached to movable pulley cart 10 (FIG. 3). Once chain 30 is in place, movable pulley cart 10 may be engaged against tubular 200 by fitting chain 30 in chain tensioner 32 (FIG. 2) and tensioning chain 30 about tubular 200 until a desired tension is achieved.

Movable pulley cart 10 may be started from a position wherein movable pulley cart 10 is initially removably parked on or otherwise attached or docked to diamond wire saw 1. Movable pulley cart 10 is released from diamond wire saw 1 prior to moving movable pulley cart 10 about the predetermined portion of the outer surface of tubular 200. Where diamond wire saw 1 comprises one or more magnets 62, these magnets 62 may be used to aid in adhering diamond wire saw 1 to tubular 200.

Once movable pulley cart 10 is engaged against tubular 200, rotation of diamond wire 50 may begin. As diamond wire 50 rotates, movable pulley cart 10 is moved about the predetermined portion of the outer surface of tubular 200. As illustrated at FIGS. 8A-8E, in embodiments diamond wire 50 may be extended towards tubular 200 from diamond wire saw 1 to engage tubular 200, e.g. as movable pulley cart 10 travels about the outer surface of tubular 200. While movable pulley cart 10 travels about the outer surface of tubular 200, an exposed length of diamond wire 50 may be allowed to either lengthen or shorten as needed to allow diamond wire 50 to engage the outer surface of tubular 200, thereby cutting tubular 200. The lengthening/shortening can be accomplished at least in part by contracting or extending chain tensioner 32 and/or by contracting or extending diamond wire 50 with respect to diamond wire saw 1 to keep the exposed length of diamond wire 50 in tension while movable pulley cart 10 moves about the predetermined portion of the outer surface of the tubular 200.

When cutting is competed, movable pulley cart 10 may be parked back on, or otherwise attached or docked to, diamond wire saw 1, e.g. on a side opposite the side of diamond wire saw from which movable cart 10 was first attached or docked.

Accordingly, diamond wire cutter 100, using an adjustable length pulley system and movable pulley cart 10, can perform a through-cut of complete sections of tubular 200 by moving movable cart 10 about the outer circumference of tubular 200 while using diamond wire 50 to cut tubular 200 between movable cart 10 and diamond wire saw 1.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A diamond wire cutter, comprising:
  a. a diamond wire saw, comprising:
    i. a diamond wire rotator;
    ii. a diamond wire operatively in communication with the diamond wire rotator, the diamond wire comprising a fixed total length and a variable exposed length;
    iii. a chain comprising a first chain end and a second chain end; and
    iv. a chain driver operatively connected to the chain;
  b. a movable pulley cart disposed proximate to the diamond wire saw and comprising:
    i. a diamond wire pulley adapted to receive a portion of the diamond wire; and
    ii. a chain receiver adapted to receive the first chain end and the second chain end; and
  c. a chain tensioner adapted to receive a predetermined portion of the chain and maintain tension on the chain.

2. The diamond wire cutter of claim 1, wherein the chain tensioner is disposed at least partially within the diamond wire saw.

3. The diamond wire cutter of claim 1, wherein the movable pulley cart disposed proximate to the diamond wire saw is releasably connected to the diamond wire saw.

4. The diamond wire cutter of claim 1, wherein the diamond wire saw further comprises an expandable pulley adapted to accept the diamond wire.

5. The diamond wire cutter of claim 1, wherein the diamond wire saw further comprises a buoyancy float.

6. The diamond wire cutter of claim 1, wherein the diamond wire saw further comprises a magnet adapted to aid in adhering the diamond wire saw to a structure to be cut.

7. The diamond wire cutter of claim 1, wherein the diamond wire cutter comprises a remotely operated vehicle compatible diamond wire cutter, the remotely operated vehicle compatible diamond wire cutter comprising:
  a. a remotely operated vehicle compatible handle disposed about a predetermined portion of the diamond wire saw; and
  b. a remotely operated vehicle power interface operatively in communication with the diamond wire rotator and the chain driver.

8. The diamond wire cutter of claim 1, wherein the chain driver comprises:
  a. a motor; and
  b. a drive wheel operatively connected to the motor.

9. The diamond wire cutter of claim 1, wherein the chain end comprises:
  a. a first chain receiver adapted to receive the first chain end; and
  b. a second chain receiver adapted to receive the second chain end.

* * * * *